United States Patent [19]

Russell

[11] 4,138,700
[45] Feb. 6, 1979

[54] CONTAINER FOR USING A MINIATURIZED CARTRIDGE IN AN EIGHT-TRACK PLAYER

[75] Inventor: Hugh M. Russell, Houston, Tex.

[73] Assignee: Module-Eight Corporation, Houston, Tex.

[21] Appl. No.: 751,148

[22] Filed: Dec. 16, 1976

Related U.S. Application Data

[63] Continuation-in-part of Ser. No. 589,792, Jun. 23, 1975, abandoned.

[51] Int. Cl.² .................... G11B 23/06; G11B 15/18
[52] U.S. Cl. ................. 360/93; 242/55.19 A; 360/132
[58] Field of Search .............. 360/94, 91–93, 360/96, 132; 242/199–200, 55.19 A; 226/168, 176, 177, 181, 190

[56] References Cited

U.S. PATENT DOCUMENTS

| | | | |
|---|---|---|---|
| 3,511,449 | 5/1970 | Mathus et al. | 242/55.19 A |
| 3,675,867 | 7/1972 | Solomon | 242/55.19 A |
| 3,708,135 | 1/1973 | Lace | 360/93 |
| 3,849,789 | 11/1974 | Ono | 360/94 |
| 3,913,856 | 10/1975 | Hara et al. | 242/55.19 A |
| 3,922,719 | 11/1975 | Negishi et al. | 360/94 |
| 3,950,785 | 4/1976 | Findley | 360/94 |
| 3,963,189 | 6/1976 | Sharp | 360/93 |

*Primary Examiner*—Alfred H. Eddleman
*Attorney, Agent, or Firm*—Bard & Groves

[57] ABSTRACT

A miniaturized tape cartridge is provided and which is designed to fit within a cartridge container of dimension allowing the container/cartridge assembly to be inserted into and played in a conventional-type eight-track player machine. The container is designed and provides for the insertion of the tape cartridge within either end of the container, and either end of the loaded container may be inserted into the eight-track playing machine. The container includes a pair of pinch wheels, one at each end thereof, whereas the pinch wheel of the tape cartridge is effectively eliminated. Within the tape cartridge is a continuous loop of magnetic tape. The tape cartridge is so constructed and arranged whereby it will record and play the same amount of material as the conventional eight-track tape musical album.

12 Claims, 7 Drawing Figures

CONTAINER FOR USING A MINIATURIZED CARTRIDGE IN AN EIGHT-TRACK PLAYER

RELATED PATENT APPLICATION

This application is a continuation-in-part of my prior copending U.S. Pat. Application Ser. No. 589,792, filed June 23, 1975, now abandoned.

BACKGROUND OF INVENTION

Much of the currently produced speech or musical sounds are recorded on magnetic tape. To produce a tape recording of speech or music, the sound is converted into corresponding electric signals by means of a microphone in conjunction with various amplification apparatus. These electric signals or voltage oscillations in turn produces variations in the strength of an existing magnetic field. The signals are thereby recorded on a magnetic tape which is magnetized along its length in accordance with the signals impressed on it.

In early tape recorders, steel wire or tape was used but has since been replaced by a plastic tape which is provided with a coating of powdered red iron oxide to provide a magnetic recording medium. The black oxide of iron is sometimes used for the same purpose. In any event, the oxide particles which are applied to the tape in a coating mixed with a binder substance, are strongly magnetizable and retain their magnetic properties almost indefinitely.

Sound is transmitted as pressure waves in the air. The lowest musical notes have a frequency of about 30 cycles per second. The highest notes of musical significance are about 4,000 cycles per second. The highest audible frequencies are in the 12,00 – 16,000 cycles per second range.

The tone color or timbre, however, consists of a complex mixture of frequencies, due to harmonies which may have as much as six times as high a frequency as that of the fundamental tone of the sound. All of these vibrations are picked up by the microphone, amplified and converted into variations in the magnetic field of an electromagnet in the recording head, whereby these variations are recorded on the magnetic tape.

To reproduce the sounds, the tape is passed over a similar head, called the reproducing head, at the same speed as that used in the recording. The magnetism stored in the tape induces voltage oscillations in the electromagnetic coil of the head and the electric signals thus produced are then used to energize a speaker.

The recording head consists of a coil wound about a core of magnetic iron which has a gap at the point where the tape moves across its surface. The current in the coil magnetizes the particles in the tape. During playback, the process is reversed. Thus, the recording head can be used as the reproducing head.

The faster the tape travels past the recording head, and subsequently past the reproducing head, the clearer will be the reproduction of the sound. This is for the reason that a higher tape speed provides more space for accommodating the highest frequencies on the tape. In order to record an overtone of, for example, 5,000 cycles per second, it is necessary to record 5,000 oscillations in the strength of the magnetic field on the tape during each second of its passage past the recording head. In ratio broadcasting, a tape speed of 15 inches per second is normally employed. Thus, each of the 5,000 oscillations has a space of 15/5,000 or 0.003 inches. Tape recorders for amateurs are usually operated at tape recording and playing speeds of 7½ inches per second, 3¾ inches per second, or 1⅞ inches per second. Most machines are provided, however, with means for providing any of these three speeds as is desired.

The widths of tape available for the recording of each oscillation of the overtone of 5,000 cycles per second are thus 0.0015 inches, 0.00075 inches, and 0.000375 inches, respectively. There is a progressive decline in recording and reproduction quality as the speed is lowered, since the width of the gap in the recording and reproduction head cannot be reduced indefinitely. Thus, each oscillation requires a certain minimum amount of space which is greater as the head and gap are of coarser construction. The greater the fineness and precision of the head, the more expensive is the tape recording equipment. To achieve high-fidelity recording and reproduction it is necessary to take many technical factors into account. Sound recorders for professional purposes generally include three motors, for example, one on the supply reel, one on the take-up reel, and a third motor drives the tape, Extreme care is taken to provide a smooth and uniform drive. Tape recorders for amateurs record generally on one-half of the ¼ inch wide tape. Some machines are designed to record four or eight tracks on a ¼ inch tape.

A great advantage of magnetic recording is that the recording can be erased and the tapes used over and over again. The erasure is done by the erasing head which produces a powerful and high alternating field that demagnetizes and thus erases the tape just before it passes the recording head.

This invention relates generally to eight-track tape cartridges and more particularly to a compact modular tape cartridge that fits inside a container, and can be used in an eight-track playing machine to perform the same functions of the larger eight-track tape cartridge. The eight-track tape cartridge assembly may be made of plastic by the injection molding procedure.

Eight-track tape cartridges contain a continuous loop of magnetic tape which is recorded in eight separate tracks. The tape travels through guides in the face of the cartridge with the recorded side of the tape facing the playback head in the eight-track playing machine. Depending on the type of playback head and depending on the number of tracks recorded on the tape to be read by the playback head, stereo, or quadraphonic sound may be played.

The music or message that is recorded on an eight-track tape continuously travels through the cartridge. The movement of the tape is due to the tape being pressed between a rotating pinch wheel built into the cartridge and the motorized capstan in the playing machine which moves the tape at a constant speed of 3¾ inches per second. The tape is spliced at the end of the recording with a conductive tape so that when the conductive tape passes in front of a switching device in the playing unit, the playing head physically moves to read a different set of tracks with a different song or message. The playback head may be designed to read two separate channels, or it may be designed to read four separately recorded tracks for quadraphonic sound, giving a total of two channels.

In the music industry, the average number of songs recorded on an eight-track stereo tape is three per channel. Though it is common knowledge in the music industry that one song per channel would provide the listener with immediate retrieval of a particular song, the cost of the conventional cartridge would still remain the same, and only a relatively small reduced cost of a shorter length of magnetic tape would be enjoyed.

SUMMARY OF THE INVENTION

This invention is for an improved tape cartridge adapted to be played in an eight-track playing machine. More particularly, there is provided a miniaturized tape cartridge which is designed to fit within a cartridge container of dimension allowing the container/cartridge assembly to be inserted into and played in a conventional-type eight-track player machine. The container is designed and provides for the insertion of the tape cartridge within either end of the container, and either end of the loaded container may be inserted into the eight-track playing machine. The container includes a pair of pinch wheels, one at each end thereof, whereas the pinch wheel of the tape cartridge is effectively eliminated. Within the tape cartridge is a continuous loop of magnetic tape. The tape cartridge is so constructed and arranged whereby it will record and play the same amount of material as the conventional eight-track tape musical album.

In one particularly ideal embodiment of the present invention, a more conveniently sized eight-track cartridge is provided which is adapted to produce and provide the same results as conventional eight-track cartridges twice the size. Thus, the cartridge of the present invention is half the size of conventional cartridges and is still capable of being played on existing eight-track player apparatus. Although half the size of conventional cartridges, the tape cartridge of the herein disclosed invention includes the same amount of magnetic tape as the larger conventional eight-track cartridge tape albums.

Another advantageous feature of the present invention, resides in the fact that unlike the conventional cartridges on the market today, the improved tape cartridge of the present invention does not include therein a pinch wheel. Thus, the resulting costs of providing a separate pinch wheel in each manufactured tape cartridge is avoided. This is provided herein by including the pinch wheel in the cartridge container rather than in the tape cartridge itself. The pinch wheel is removably mounted in the cartridge container and this fashion of mounting the pinch wheel provides easy access thereto for the purposes of cleaning and replacement. This removable mounting feature of the pinch wheel in the container for the tape cartridge has been otherwise unknown in the industry and provides an arrangement of a pinch wheel assembly that hitherto could not be replaced or readily cleaned.

In accordance with the present invention and by virtue of the reduced size of the herein disclosed tape cartridge, one is enabled to store twice as many cartridges in any given area. Thus, a standard glove compartment of an automobile is adapted to hold therein twice as many of the tape cartridges of the present invention than would be the case of the larger conventional eight-track cartridges presently available. It is also another advantageous feature of the reduced size of the tape cartridge disclosed herein that only half as much plastic material of construction will be required to manufacture the unit than is the case with the larger eight-track cartridges on the market today.

Accordingly, it is a feature of the present invention to provide a system whereby the cost per single song selection is reduced, and wherein the same amount of recording and playing time is provided as is the case with conventional eight-track cartridge albums.

It is also a feature of the present invention to provide a tape cartridge of reduced size when compared to the size of the conventional eight-track cartridges, and to therefore reduce the amount of storage space but at the same time retaining the length of playing time.

A further feature of the present invention is to provide a container which has an outer design similar to an eight-track tape cartridge. Inside the container there are provided two pinch wheels mounted on posts at both of its ends. The cartridge that is placed inside the container is designed without a pinch wheel and is designed to be placed into the container, utilizing the container pinch wheel. Therefore, the cost of a pinch wheel being placed in each cartridge is eliminated.

Another feature of the invention is that the cartridge is reduced in size to such an extent that two cartridges can be placed inside the container at either end, and either end of the containerized cartridge can be used in a conventional eight-track player. Therefore, the cost of plastic for the cartridge, on a song per channel basis, is reduced.

A still further feature of the present invention is that enough magnetic tape can be wound in a continuous loop on a spool (though the cartridge is still half the size of a conventional eight-track cartridge) to be of sufficient length to play the same amount of songs as a conventional eight-track cartridge.

Briefly stated, the invention provides an eight-track tape cartridge system that will provide the same uses as a conventional eight-track cartridge but at a reduced cost of manufacture per playing time in a more convenient size.

These and other features and advantages of the present invention will become apparent from the following detailed description, wherein reference is made to the figures in the accompanying drawings.

IN THE DRAWINGS

DETAILED DESCRIPTION

Figure 1:
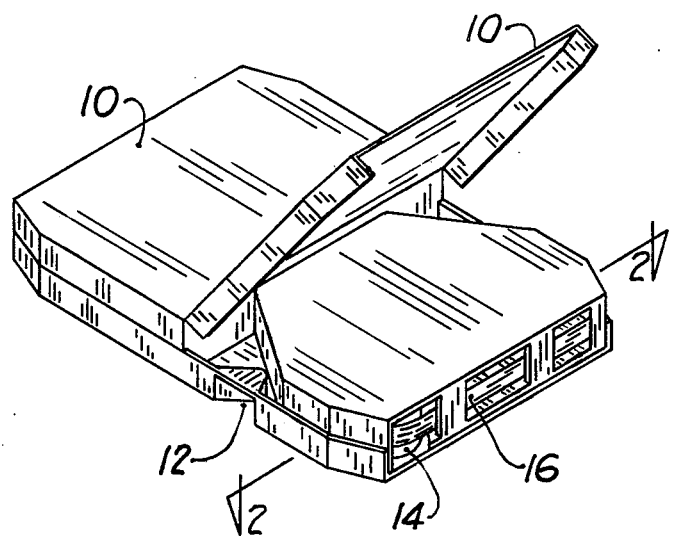
FIG. 1 is a view showing the container with one of the lids thereof open and exposing at one end thereof the miniaturized tape cartridge.
Figure 2:
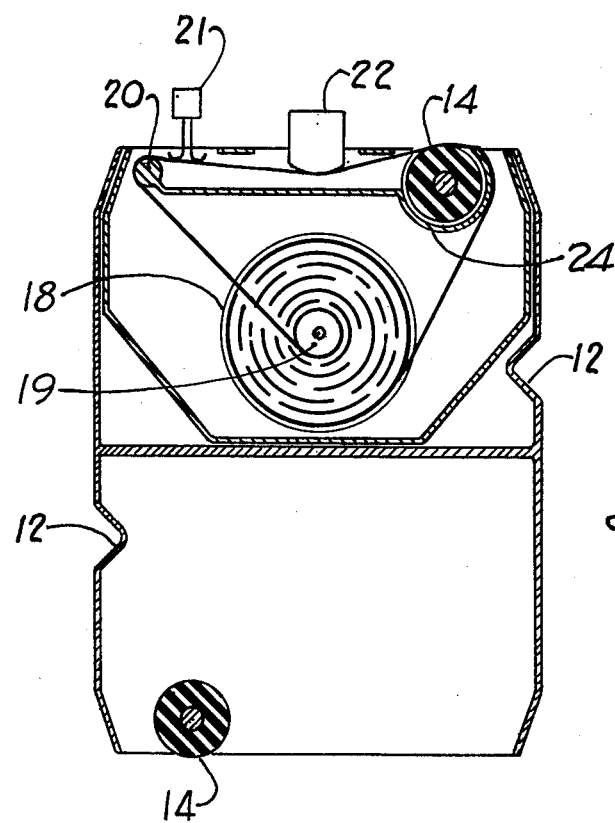
FIG. 2 is a pictorial representation of the article depicted in FIG. 1 wherein the mechanical features and configuration thereof is illustrated in greater detail and showing the switching mechanism and recording head of an eight-track playing machine.
Figure 3:
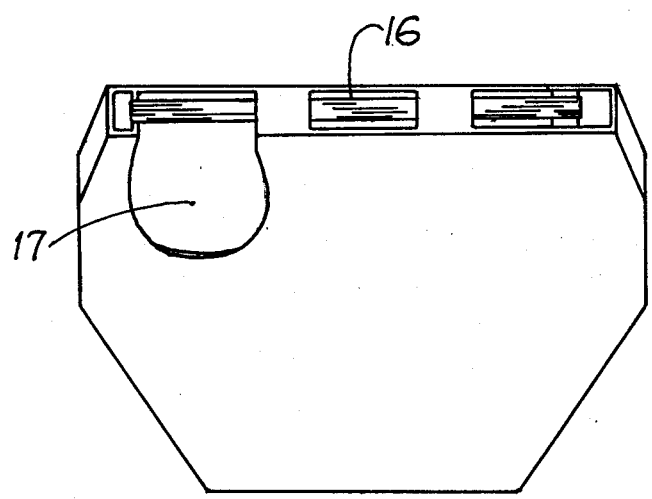
FIG. 3 is a pictorial bottom view of the tape cartridge of the present invention and showing the cut-out feature of the cartridge which enables the cartridge to be placed over and received upon either one of the pinch wheels of the container.

Referring now to the drawings, and more particularly to FIGS. 1 – 3, there will be seen the container 10 of the present invention and having one lid thereof open as seen in FIG. 1. A notch 12 is provided on both sides of the container and constitutes the locking device for holding container 10 in a conventional eight-track player. As will be apparent from FIG. 2, the container 10 includes therein a pair of pinch wheels 14. The magnetic tape 16 is seen to travel around guide post 20, past the switching mechanism 21, further toward and across the play-record head 22 of the eight-track playing machine, and then crosses the opening defined by cut-out 17. The tape thereupon travels across curved guide surface 24 and returns to the outer edge of the tape spool 18. The base plate of the axle 19 that supports the spool 18 is anchored to the floor of the cartridge. As seen in FIG. 3, the tape cartridge includes in its underside a circular cut-out 17 which allows the tape cartridge to be placed over and to be received upon either one of the pinch wheels 14 of the container.

Referring more particularly to FIG. 1, it will be seen that the tape cartridge unit is sized to fit within one half section of the container unit 10. Thus, container unit 10 is constructed to include a pair of lids with only one being shown in its raised position in FIG. 1. With lid 10 opened as shown, the small-sized tape cartridge may be easily removed from the container and a different tape cartridge re-inserted therein. By alternately opening and closing both lids of container 10, two tape cartridges may be removed or replaced. Obviously, the container 10 may be inserted into the eight-track player with only one tape cartridge therein. However, both ends of the container may contain a tape cartridge, in which case, one tape is played, and then the container is reversed to play the tape cartridge on the other end thereof. Thus, as clearly shown in FIG. 2, the container 10 includes a pinch wheel 14 at each end thereof for the reception of two tape cartridges, if desired, although as noted above, the container may be played while including only a single tape cartridge therein.

With reference now to FIG. 2, the head 22 and switch 21 are standard components of a conventional eight-track player and details thereof are familiar to those skilled in this area of the art. Needless to say, however, switch 21 monitors a metallic station changing strip placed on tape 16. Each time the metallic strip passes switch 21, the head 22 is caused to read another of the stations or tracks on the endless tape 16. Thus, tape 16 is seen to feed in an endless path from the interior of spool 18 and from the spool axle 19. The tape 16 then proceeds across the top of the spool 18 and is guided towards the switch 21 and head 22 by means of guide post 20 which is integral with the tape cartridge. The tape 16 thereupon passes across one side of the pinch wheel 14 as shown, which pinch wheel 14 supports the tape for engagement with the drive capstan of the eight-track playing machine. The drive capstan (not shown) turns the pinch wheel 14 with the tape 16 disposed therebetween, and hence the tape 16 is caused to travel in an endless path. Guide surface 24 thereupon directs the tape 16 again to the outside of spool 18 as it passes outside thereof. While FIG. 2 illustrates only a single tape cartridge received in the container unit at the upper end, obviously a second tape cartridge may be provided in the lower end thereof and in association with the lower pinch wheel 14. Thus, when the upper tape cartridge has finished playing, it is merely required to remove the container from the player and reverse the ends, thereby playing the tape on the lower tape cartridge.

As noted above, it is a feature of the present invention to provide for the easy replacement of the pinch wheel 14 and the cleaning thereof. This should be apparent from FIG. 2. Thus, as shown in the lower half thereof, the pinch wheel is totally accessible when the tape cartridge is removed from the container. The pinch wheel 14 is removably mounted in the container by conventional means such as a snug-fitted post, and may thereby be removed for cleaning thereof or replaced in its entirety by a new pinch wheel. This easy accessible feature is of importance since the pinch wheel must be cleaned from time to time in order to remove the graphite film that builds up thereupon from continued use over a long period of time. A simple swabbing of the pinch wheel with cotton soaked in alcohol has been found sufficient to remove this film which is deposited thereon by passage of the tape thereabout.

Figure 5:
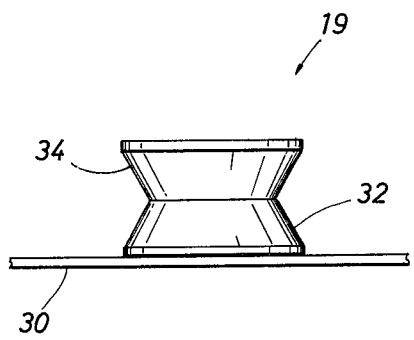
FIG. 5 is a pictorial side view of the continuous loop spool that is provided in the tape cartridge depicted in FIG. 2.

Since it is considered critical that the tape 16 leave the spool 18 in as smooth a fashion as possible, it has been found to be desirable to construct the spool axle 19 with guide surfaces which direct the tape upwardly therefrom. Thus, with reference to FIG. 5, there is shown the details of the spool wherein is seen the base member plate 30 which is preferably attached to the bottom of the tape cartridge. Extending upwardly of the base member 30 is the spool axle shown generally at 19. The axle 19 includes a pair of inverted and frusto-conical surfaces 32 and 34. The tape spool 18 is carried by the axle 19 with the tape 16 disposed generally within the confines of these surfaces. However, as the tape is fed from the interior of spool 18, these surfaces 32 and 34 function to smoothly guide the tape from the interior of spool 18 and upwardly therefrom for travel above the spool and toward guide post 20. The emergence of the tape smoothly from the axle 19 prevents any bending, kinking, or damage being imparted to the tape.

Figure 4:
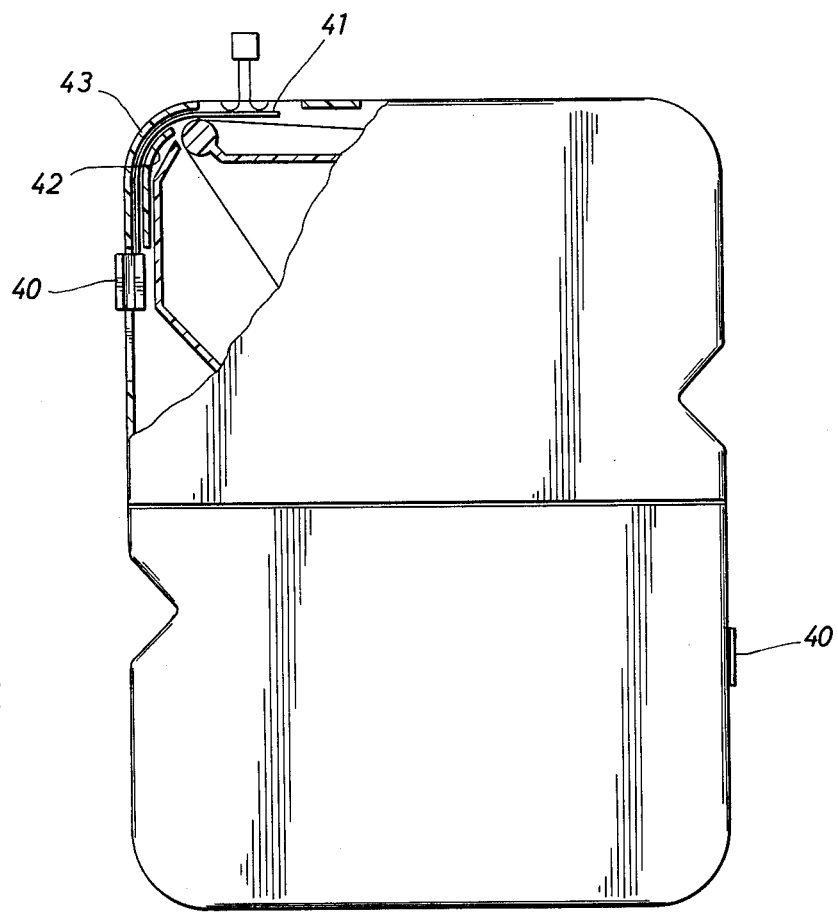
FIG. 4 is a pictorial view of an embodiment of the present invention wherein there is provided means for blocking the switching mechanism of the eight-track player whereby the tape cartridge will play the same track or station over and over again.

Referring now to FIG. 4, there may be seen a simplified pictorial representation of a modified version of the container depicted in FIG. 2. Thus, means are provided for effectively blocking the actuation of the switch mechanism 21. This will be seen to include an actuating button 40 located on one side of the container. Attached to the button 40 is a narrow strip of TEFLON or other non-conductive material that extends along one wall of the container. The container includes further a pair of guide surfaces 42 and 43 that direct the TEFLON strip 41 toward and between the tape and the switch 21. This disposition of the strip 41 between the tape and switch 21 blocks the action of the switch 21 from reading the metallic station or track changing strip on the tape 16. Thus, with button pushed upwardly, the tape cartridge will continue to play on the same station or track and will not shift tracks in the event that the metal strip passes switch 21. This mechanism is, of course, desirable where it is convenient to play the same track over and over again, and without the necessity of listening to other sounds on the other tracks or stations of the tape.

Figure 6:
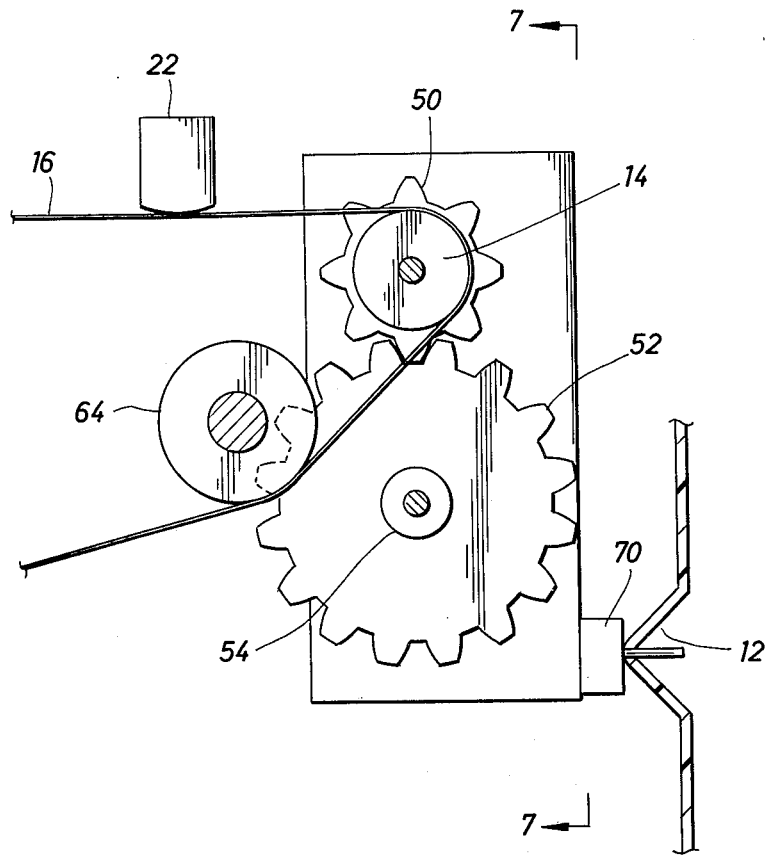
FIG. 6 is an alternate embodiment in pictorial representation and illustrating mechanism therein for providing a speed change of the tape through the unit.
Figure 7:
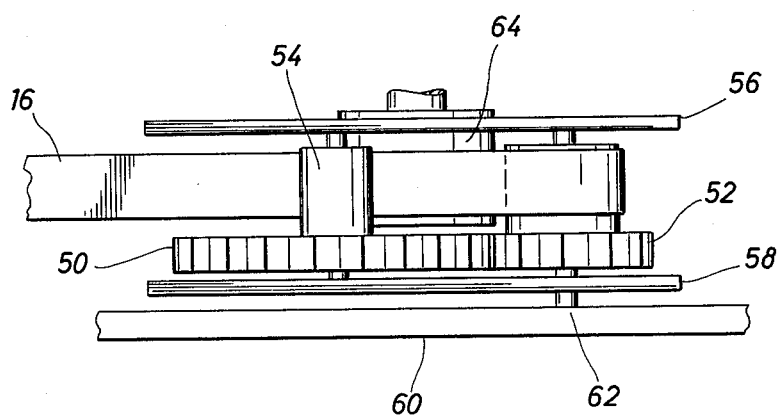
FIG. 7 is a pictorial side view of the speed change mechanism depicted in FIG. 6 and illustrating the pivoted relationship of the pinch wheel and capstan of the tape cartridge.

In many cases, it may be found that the speed of operation of the eight-track playing machine is different from the speed of recording of the tape cartridge to be played therein. In order to overcome this problem, the invention as depicted in FIGS. 6 and 7 provides a simple and convenient manner of bringing both speeds into alignment and equalization one with the other, whereby the tape cartridge may be played nevertheless. This system as depicted in FIGS. 6 and 7 contemplates a geared reduction system. Thus, there is shown the tape 16 and recording head 22 as depicted in FIG. 2, for example. A pinch wheel 14 is again provided, however, in this instance, the pinch wheel will be seen to include a flat gear 50 or pulley located at the bottom thereof. A second gear 52 is arranged to mesh with gear 50 and this second gear carried at its center an upstanding capstan 54. Both the geared pinch wheel 14 and the geared capstan 54 are mounted between a pair of plates 56 and 58. These plates 56 and 58 are in turn pivotally mounted as a unit to the bottom 60 of the tape cartridge at point 62. Thus, as viewed in FIG. 6, the geared unit will swing from right to left, and vice versa. As the unit swings left, the tape 16 will be placed between the capstan 54 and a second pinch roller 64. This movement of the unit occurs as a result of tab 70 being pushed to the left as the container is inserted into the playing machine and locked therein at notch 12. Since the capstan of the playing machine drives the geared pinch wheel 14, appropriate sizing of the gears 50 and 52 will result in the same speed being transmitted to the tape 16 at pinch roller 64. It should be apparent therefore, that if the playing machine capstan operates at 7½ inches per second but that the tape to be played was recorded at only 3¾ inches per second, that appropriate sizing of the gears 50 and 52 will reduce the effective speed of the tape at pinch wheel 64 to its recorded speed of 3¾ inches per second. This simple system enables tapes of different recorded speeds to be played on playing machines where the recorded speed of the tape is not otherwise available.

It will be apparent that the foregoing structures provide another significant advantage. Since the purpose of the structure is to rotate the tape at one half of the speed of the recording machine the foregoing apparatus effectively doubles the capacity of the tape when used with conventional playing equipment.

It will be apparent from the foregoing that many other variations and modifications may be made in the structures and methods described herein without substantially departing from the essential concept of the present invention. Accordingly, it should be clearly understood that the forms of the invention described herein and depicted in the accompanying drawings, are exemplary only and are not intended as limitations in the scope of the present invention.

What is claimed is:

1. A modular tape cartridge assembly comprising:
    a cartridge container having removably mounted therein two pinch wheels, one pinch wheel being located at each end of the container, and
    a tape cartridge containing a continuous loop of magnetic tape,
    said tape cartridge being received in said container cartridge with said tape being disposed in abutting relationship to at least one of said pinch wheels.
2. An assembly as described in claim 1, wherein said cartridge includes at least one lid for receiving said tape cartridge.
3. A modular tape cartridge assembly and the like comprising:
    a cartridge holder having removably mounted therein a pinch wheel at each end thereof,
    a tape cartridge containing a continous loop of magnetic tape therein, and
    means for mounting said tape cartridge on said cartridge holder with said magnetic tape being in abutting relationship to at least one of said pinch wheels.
4. The assembly as described in claim 3, wherein said holder includes a lid for receiving said tape cartridge.
5. The assembly as described in claim 3, including a second tape cartridge containing a continuous loop of magnetic tape therein, said second tape cartridge being received within said holder with the magnetic tape thereof being in abutting relationship to the other of said pinch wheels.
6. The assembly as described in claim 5, wherein said holder includes a second lid for receiving said second tape cartridge.
7. The assembly as described in claim 3, and including a spool axle for mounting a supply of said tape, said axle including at least one frusto-conical surface.
8. The assembly as described in claim 3, wherein said holder includes at least one open face, and movable means for blocking at least a portion of said open face.
9. The assembly as described in claim 3, wherein said tape cartridge includes a pinch wheel therein, and means for rotating said cartridge pinch wheel at a preselected submultiple of the speed of rotation of said container pinch wheel.
10. The assembly as described in claim 5, and including a spool axle for mounting each supply of said tape, each axle including at least one frusto-conical surface.
11. The assembly as described in claim 5, wherein said holder includes at least one open face, and movable means for blocking at least a portion of said open face.
12. The assembly as described in claim 5, wherein each said tape cartridge includes a pinch wheel therein, and means for rotating said cartridge pinch wheel at a pre-selected submultiple of the speed of rotation of said container pinch wheel.

* * * * *